United States Patent
Kuncewicz et al.

(10) Patent No.: US 11,110,903 B2
(45) Date of Patent: *Sep. 7, 2021

(54) CONTROL VALVE, ELECTRONICALLY CONTROLLABLE BRAKE SYSTEM AND METHOD FOR CONTROLLING THE ELECTRONICALLY CONTROLLABLE BRAKE SYSTEM

(71) Applicant: WABCO Europe BVBA, Brussels (BE)

(72) Inventors: Paulina Kuncewicz, Wroclaw (PL); Adam Lango, Szczytno (PL); Thomas Müller, Hannover (DE); Leszek Toma, Wroclaw (PL)

(73) Assignee: WABCO Europe BVBA, Brussels (BE)

( * ) Notice: Subject to any disclaimer, the term of this patent is extended or adjusted under 35 U.S.C. 154(b) by 157 days.

This patent is subject to a terminal disclaimer.

(21) Appl. No.: 16/572,659

(22) Filed: Sep. 17, 2019

(65) Prior Publication Data

US 2020/0086839 A1    Mar. 19, 2020

(30) Foreign Application Priority Data

Sep. 18, 2018   (EP) ..................................... 18195254

(51) Int. Cl.
*B60T 13/58*   (2006.01)
*B60T 13/38*   (2006.01)
(Continued)

(52) U.S. Cl.
CPC .......... *B60T 13/588* (2013.01); *B60T 13/385* (2013.01); *B60T 13/683* (2013.01); *B60T 13/741* (2013.01);
(Continued)

(58) Field of Classification Search
CPC .......... B60T 7/20; B60T 8/327; B60T 13/683; B60T 13/385; B60T 13/588;
(Continued)

(56) References Cited

U.S. PATENT DOCUMENTS 3,525,555 A * 8/1970 Gunter .................... B60T 15/20
303/40
6,247,764 B1 * 6/2001 Koelzer .................. B60T 8/323
303/118.1
(Continued)

FOREIGN PATENT DOCUMENTS

DE    102008031327 A1    4/2010
EP       1571061 A1    9/2005
(Continued)

*Primary Examiner* — Robert A. Siconolfi
*Assistant Examiner* — San M Aung
(74) *Attorney, Agent, or Firm* — Dickinson Wright PLLC

(57) ABSTRACT

A control valve for applying a spring-loaded brake pressure to spring-loaded parts of a rear-axle wheel brake is pneumatically activated as a function of a parking-brake braking demand and a service-brake braking demand. A first control chamber is connected via a first control piston to a control arrangement in the control valve. During an adjustment of the first control chamber via the service-brake control pressure, the spring-loaded brake pressure at the working output is a function of the service-brake control pressure or of the parking-brake control pressure. The first control piston is connected to a third control chamber, wherein the pressure in the first control chamber acts on the first control piston in one direction, and the pressure in the third control chamber acts on the first control piston in the opposite direction. The first control chamber is selectively connectable to the third control chamber via a switchable bypass valve.

22 Claims, 5 Drawing Sheets

(51) Int. Cl.
  *B60T 13/68* (2006.01)
  *B60T 13/74* (2006.01)
  *B60T 15/02* (2006.01)
  *F16K 31/42* (2006.01)

(52) U.S. Cl.
  CPC ............ *B60T 15/027* (2013.01); *F16K 31/42* (2013.01); *B60T 2270/402* (2013.01); *B60T 2270/413* (2013.01)

(58) Field of Classification Search
  CPC .... B60T 13/741; B60T 13/662; B60T 15/041; B60T 15/027; B60T 15/20; B60T 2270/414; B60T 2270/402; B60T 2270/413; F16K 31/42
  USPC .......................................................... 303/3
  See application file for complete search history.

(56) References Cited

U.S. PATENT DOCUMENTS

| | | | |
|---|---|---|---|
| 7,077,481 B2 * | 7/2006 | Marsh | B60T 13/261 |
| | | | 137/627.5 |
| 7,204,563 B2 * | 4/2007 | Soupal | B60T 13/263 |
| | | | 303/15 |
| 10,427,663 B2 * | 10/2019 | Schnittger | B60T 15/182 |
| 2004/0084090 A1 * | 5/2004 | Roether | B60T 15/027 |
| | | | 137/495 |
| 2004/0183363 A1 * | 9/2004 | Roether | B60T 8/3675 |
| | | | 303/7 |
| 2008/0258542 A1 * | 10/2008 | Soupal | B60T 13/403 |
| | | | 303/7 |
| 2014/0103237 A1 | 4/2014 | Herges | |
| 2020/0086840 A1 * | 3/2020 | Couppee | B60T 13/741 |

FOREIGN PATENT DOCUMENTS

| | | |
|---|---|---|
| WO | 2014161671 A1 | 10/2014 |
| WO | 2018041386 A1 | 3/2018 |

* cited by examiner

CONTROL VALVE, ELECTRONICALLY CONTROLLABLE BRAKE SYSTEM AND METHOD FOR CONTROLLING THE ELECTRONICALLY CONTROLLABLE BRAKE SYSTEM

TECHNICAL FIELD

The present disclosure relates to a control valve for applying a spring-loaded brake pressure, to an electronically controllable brake system with such a control valve, and to a method for controlling the electronically controllable brake system.

BACKGROUND

Conventional electronically controllable brake systems have pressure modulators which are assigned to individual vehicle axles and are activated electrically during normal operation in order to implement a certain service-brake braking requirement at the respective wheels in a service-brake circuit. The electric control takes place here proceeding from a central module which activates the respective pressure modulators via a control signal corresponding to the service-brake braking requirement.

In the event of an electric failure or defect of the electric activation, the pressure modulators are conventionally provided with pneumatic redundancy. For this purpose, a pneumatic control pressure can be transmitted to pneumatic redundancy connections of the respective pressure modulators by a service-brake valve which receives the service-brake braking demand from the driver. In the event of a failure or a defect in the electrically controlled implementation of the braking operation, the pressure modulators ensure air quantity boosting of the control pressure and application of the brake pressure to the respective service brakes. By this way, a pneumatic redundancy can be formed.

Furthermore, in addition to the service-brake circuit, such brake systems have a parking-brake circuit in which a parking-brake brake requirement from the driver can be received via a parking-brake valve. As a result, a parking-brake control pressure is released by the parking-brake valve to a control valve and, via the latter is released as a spring-loaded brake pressure with an air quantity boosting to spring-loaded parts of the wheel brakes, preferably the rear-axle wheel brakes. The spring-loaded parts are, as is known, constructed in such a manner that they apply the wheel brake by via spring pre-tensioning when the spring-loaded brake pressure is low and, when the spring-loaded brake pressure is higher, open the wheel brake counter to the spring pre-tensioning. Therefore, at least at the rear wheels, a braking action can be achieved via a membrane part as a function of the membrane braking pressure output—electrically or pneumatically redundant by the rear-axle pressure modulator, and via the spring-loaded part as a function of the spring-loaded brake pressure.

What is disadvantageous here is that, in order to form the pneumatic redundancy at the rear axle, pressure modulators which can be activated pneumatically are required. The pressure modulators, firstly, are constructed in a technically complicated manner and, secondly, a high outlay has to be expended on installing pressure lines to the rear axle, the pressure lines being required only for the redundancy.

WO 2014/161671 A1 and US 2014/0103237A1 each describe a combination of a relay valve and of a parking-brake valve connected upstream of the relay valve, the relay valve and the parking-brake valve being arranged separately from each other and being able to influence each other. Via the relay valve, a spring-loaded part of a wheel brake can be activated in accordance with a parking-brake braking requirement. When a required pressure set-point value is changed as a result of the parking-brake braking requirement, a reservoir pressure or an atmospheric pressure with which the relay valve is subsequently activated can be predetermined in a targeted manner for the parking-brake valve via a solenoid valve device. For this purpose, when there is a change in the pressure set-point valve, first of all an initial pulse is formed via the parking-brake valve and conducted to the relay valve and then the operation is continued with the ventilation and a venting cycle. The initial pulse causes the pressure set-point value to be reached substantially more rapidly than with pulses of a constant cycle time and constant duty cycle.

SUMMARY

It is one object of the present disclosure to provide a control valve for applying a spring-loaded brake pressure allowing a comfortable, reliable and simple pneumatic control of an electrically controllable brake system, even in the event of redundancy. It is furthermore an object to provide an electrically controllable brake system and a method for controlling the brake system.

According to the present disclosure, a control valve for applying a spring-loaded brake pressure to spring-loaded parts of a rear-axle wheel brake is expanded in such a manner that, in addition to the pneumatic activation via a parking-brake control pressure, which is output by a parking-brake valve, via a first control input, a pneumatic activation of the control valve with a service-brake control pressure, which is output by the service-brake valve and is dependent on a service-brake braking demand, is also possible, wherein, for this purpose, the first control input—in particular in the event of redundancy—is connectable or is connected to an adjustable first control chamber, wherein the first control chamber is operatively connected via a first control piston in such a manner to control arrangement in the control valve that, during an adjustment of the first control chamber or of the first control piston as a result of pressurization with the service-brake control pressure, the spring-loaded brake pressure at the working output can be set as a function of the service-brake control pressure and/or the parking-brake control pressure.

The advantage is thereby already achieved that the spring-loaded parts not only be actuable in the customary manner as a function of a parking-brake braking demand, but in addition also as a function of a service-brake braking requirement predetermined via a service-brake valve. The control valve according to the present disclosure therefore ensures that, in addition to the parking-brake control pressure, the service-brake control pressure is also converted into a corresponding spring-loaded brake pressure, and therefore via the latter a redundant activation of the rear-axle wheel brakes can advantageously take place—in this case via the spring-loaded part. Accordingly, the redundant pneumatic activation of a rear-axle pressure modulator can be dispensed with. The rear-axle pressure modulator can advantageously be constructed more simply as a result because only an electric activation is still necessary. For the pneumatic redundancy at the rear axle, recourse can then be made to parts of the parking brake or parking-brake circuit, which parts already have pneumatic components and permit pneumatic activation.

The first control piston is furthermore operatively connected to a third control chamber, wherein the following forces act on the first control piston: When the first control chamber is pressurized with the service-brake control pressure, a first compressive force acts in a first direction; and when the third control chamber is pressurized with the same service-brake control pressure, a second compressive force acts in a second direction opposed to the first direction.

The first control chamber is selectively connectable to the third control chamber via a switchable bypass valve for charging the two control chambers with the same service-brake control pressure.

The effect which can advantageously be achieved by this is that it is possible to selectively control or modulate the application of the spring-loaded brake pressure, the application being dependent on the service-brake braking demand. Accordingly, the adjustment of the first control piston and therefore of the first control chamber can be influenced in a targeted manner by additionally using the third control chamber because the first compressive force from the first control chamber is counteracted on the basis of the third control chamber.

It can accordingly first of all be defined by a corresponding switching over of the bypass valve whether a direct or strong influencing of the spring-loaded brake pressure is intended to take place by means of the service-brake control pressure, by the third control chamber being decoupled. In this case, only the first control chamber has an influence on the operation or the setting of the control valve. However, by means of corresponding switching over of the bypass valve, a slightly weakened influencing can also take place by the third control chamber being connected to the first control chamber. The operation of the control valve is then not highly influenced because of a combination of the two control chambers because some of the first compressive force is neutralized again by the second compressive force. It is therefore advantageously possible by means of the control valve according to the present disclosure to define a characteristic or transmission with a plurality of actuating regions, describing the spring-loaded brake pressure which results from a certain service-brake control pressure as a consequence of a service-brake braking demand.

In this connection, the first control chamber is separated from the third control chamber by a first wall connected to the first control piston and the service-brake control pressure acts in the first control chamber on a first surface of the first wall and, depending on the switching position of the bypass valve, the service-brake control pressure acts in the third control chamber on a second surface of the first wall. As a result, the compressive force counter effect proposed according to the present disclosure can be implemented in a simple manner when the bypass valve is brought into the corresponding switching position.

For this purpose, the first surface is larger than the second surface, and therefore, when the first control chamber is pressurized with the service-brake control pressure, a first compressive force acts on the first control piston in the first direction, the compressive force being larger than a second compressive force on the first control piston in the second direction during simultaneous pressurization of the third control chamber with the same service-brake control pressure. The effect which can advantageously be achieved by this is that, in the event of an increase in the pressure of the service-brake control pressure, a movement of the control piston in the first direction is brought about, from which a reduction in the spring-loaded brake pressure preferably follows in the control valve according to the present disclosure, which results in an increased braking action. The area ratios therefore make it possible to set in a specific manner the direction in which the first control piston moves during a change in pressure and how strongly the movement takes place, i.e. how strongly the spring-loaded brake pressure rises in the event of a certain increase in the service-brake control pressure. The braking action can thereby be set in a targeted manner.

According to a preferred development, a piston element is arranged on the second surface of the first wall, wherein the piston element projects through the third control chamber in such a manner that the second surface on the first wall is reduced, wherein the second compressive force on the first control piston during pressurization of the third control chamber with the service-brake control pressure is brought about only by the action of the service-brake control pressure on the second surface which is reduced by the piston element. A certain area ratio and therefore a certain relationship between entering service-brake brake pressure and applied spring-loaded brake pressure can therefore be set in a simple manner. For example, it can thereby also be established that, at half of a maximum service-brake control pressure, the spring-loaded brake pressure has likewise risen to half of a maximum spring-loaded brake pressure.

Preferably, the bypass valve can be switched over as a function of a defined pressure limit in the first control chamber, wherein the first control chamber is connected to the third control chamber via the bypass valve when, during pressurization of the first control chamber with the service-brake control pressure, the service-brake control pressure exceeds the defined pressure limit, and the first control chamber is not connected to the third control chamber via the bypass valve when the service-brake control pressure falls below the defined pressure limit. An inflexion point in the characteristics can thereby be advantageously defined, which can be used, for example, in order to more rapidly reach a certain point in the spring-loaded brake pressure.

For example, the pressure limit can be set to between 0.5 bar and 0.7 bar. Up to the service-brake control pressure, a corresponding spring-loaded brake pressure is applied by the control valve, the spring-loaded brake pressure, because of the spring characteristic curve of the spring-loaded part of the rear-axle wheel brakes, still leading to only a small change, if any at all, in the braking action because of an idling path. If the service-brake control pressure exceeds the pressure limit, a braking action is achieved because of the spring-loaded brake pressure thereby applied. In order to more rapidly bridge the idling path, only the service-brake control pressure from the first control chamber acts on the first control piston, i.e. a weakened adjustment of the first control piston does not take place. As a result, when the service-brake valve is actuated, the driver quite rapidly feels a reaction correlating with the brake-pedal actuation.

Preferably, the bypass valve can be switched over in a pressure-controlled manner, and therefore no further electronic components and logic modules are necessary. For this purpose, the bypass valve preferably has a bypass control piston, wherein the bypass control piston can be adjusted depending on a switching pressure acting in a bypass pressure chamber, wherein the switching pressure corresponds to the pressure in the first control chamber, for the pressure-controlled switching over of the bypass valve. The bypass valve is therefore switched over as a function of the service-brake braking demand actually present, and therefore a setting coordinated thereto can take place.

Preferably, the bypass control piston has a bypass intermediate chamber via which the first control chamber is connectable to the second control chamber, wherein, in a first switching position of the bypass valve, the bypass intermediate chamber is opened up in order to connect the first control chamber to the third control chamber and, in a second switching position of the bypass valve, is closed by a closure piston in order to separate the connection between the first control chamber and the third control chamber. As a result, a pressure-controlled connection of the control chambers can take place in a simple manner if, for example, the pressure limit has been exceeded.

According to a preferred development, in the first switching position of the bypass valve, the closure piston closes a bypass inlet, wherein the bypass inlet is connected to the atmosphere, and, in the second switching position of the bypass valve, the bypass inlet moves off from the closure piston and is thereby connected to the third control chamber in order to vent the third control chamber. In the respective switching positions, it is therefore possible in a simple manner via the closure piston for either the connection between the control chambers to be separated or the connection of the atmosphere to the third control chamber, with this preferably taking place as a function of the pressure limit.

According to a preferred development, the control arrangement is formed by an adjustable second control chamber and an adjustable second control piston, wherein the parking-brake control pressure can be admitted into the second control chamber via the second control input and the second control piston is adjustable in a first direction and/or a second direction opposed to the first direction by action of the parking-brake control pressure on the second control piston. A simple piston adjustment which can be used for air quantity boosting of the parking-brake control pressure for setting the spring-loaded brake pressure can therefore be achieved.

The control arrangement in the control valve therefore ensures that a certain spring-loaded brake pressure arises at the working output of the control valve as a function of the parking-brake control pressure, which corresponds to conventional air quantity boosting in the parking-brake circuit. Owing to the fact that the first control chamber likewise interacts with the control arrangement, the respective service-brake control pressure admitted into the first control chamber can also have an influence on the spring-loaded brake pressure and therefore, as a function thereof, a pneumatically redundant activation of the rear-axle wheel brakes can also take place.

This preferably takes place by the fact that the second control chamber is bounded by a third wall arranged on the adjustable second control piston, wherein the third wall is movable in relation to the valve housing in such a manner that the second control piston can be adjusted by action of the parking-brake control pressure on the third wall. A simple construction of the control arrangement for setting the spring-loaded brake pressure is thereby achieved.

Preferably, the first control piston is operatively connected to the second control piston in such a manner that the second control piston is carried along at least in regions by an adjustment of the first control piston. This establishes an operative connection between the control arrangement of the control valve, ensuring implementation of the parking braking operation, and the adjustable first control chamber, influenced by the respective service-brake control pressure, by a simple solution. In the event of redundancy, the service-brake control pressure can therefore ensure adaptation of the spring-loaded brake pressure by recourse being made to the control arrangement of the control valve, and therefore a simple construction of the control valve with the additional functionality (pneumatic redundancy) is achieved.

According to one embodiment, the first control piston and the second control piston can be fixedly connected to each other for this purpose, and therefore a relative movement between the two control pistons is not permitted. However, according to one alternative, the first control piston may protrude, in its lower region via a first shaft, into a hollow-cylindrical second shaft of the second control piston. The diameter of the first shaft is thereby reduced in a region of a shaft narrowing of the second shaft. As a result, the first control piston can move in a certain region relative to the second control piston. This region is defined here in such a manner that the second control piston can be moved in the non-redundant braking mode without being influenced by the first control piston. As a result, frictional losses which occur because of the first control piston which is not required in the non-redundant mode can be avoided. As soon as the first shaft passes, in particular with a lower contact surface, toward the shaft narrowing of the second shaft, which is the case, for example, when there is an increase in the service-brake control pressure in the redundant mode, the two control pistons move together, and therefore recourse can be made to the control arrangement of the control valve for adapting the spring-loaded brake pressure.

According to a preferred development, the first control chamber is bounded by a first wall which is movable in relation to a valve housing and by a second wall which is fixed to the valve housing or is connected thereto, wherein the first control piston is connected to the first wall in such a manner that the first control piston and the second control piston which is operatively connected thereto are forced by an increase in pressure in the first control chamber in a first direction. As a result, an adjustment of the first control chamber as a function of the service-brake control pressure and therefore also of the two control pistons can be achieved in a simple manner.

Preferably, the second control chamber is thereby arranged relative to the first control chamber in such a manner that the second control piston and the first control piston which is operatively connected thereto are forced, when there is an increase in pressure in the second control chamber, in the second direction when the first control chamber and/or the third control chamber are connected to the atmosphere. The effect which can advantageously be achieved by this is that, with one and the same control valve, a service-brake control pressure which is inverted in relation to the parking-brake control pressure can nevertheless be converted by the control arrangement of the control valve into a spring-loaded brake pressure which is proportional thereto. This is achieved in a simple manner specifically by an increase in pressure in the respective control chamber leading to a piston movement in the opposite direction.

This can preferably be achieved by the second control chamber—like also the first control chamber—likewise being bounded by the second wall which is fixed to the valve housing, wherein, when there is an increase in pressure in the second control chamber, the second control piston is pushed away from the second wall in the second direction, and, when there is an increase in pressure in the first control chamber, the first control piston is pushed away from the second wall in the first direction. This opposed movability in the event of an increase in pressure can thereby be obtained by simple means.

According to a preferred development, the first control chamber and the second control chamber interact with each other via the control pistons in such a manner that a spring-loaded brake pressure arises at the working output, the spring-loaded brake pressure being dependent on the parking-brake control pressure prevailing in the second control chamber and/or on the service-brake control pressure prevailing in the first control chamber, in particular depending on which braking demand associated with the control pressures is the higher. Accordingly, self-regulation advantageously takes place by means of the control valve, i.e. a currently acting braking operation of the vehicle via the spring-loaded parts of the rear-axle wheel brakes, i.e. in the parked state with a corresponding parking-brake braking demand, cannot be overridden by a redundantly predetermined service-brake braking demand which specifies a smaller braking action. If, however, a metered parking-brake braking demand is present and a redundant service-brake braking demand in the event of an electric defect or failure, the service-brake braking demand is implemented if this leads to a greater braking action than the metered parking-brake braking demand.

According to a preferred development, an axially movable valve body which is pretensioned by a compression spring is furthermore provided as the control arrangement, wherein, depending on the axial adjustment of the valve body, the working output is connectable either via a pressure chamber to a venting connection for reducing the spring-loaded brake pressure or to a supply connection for increasing the spring-loaded brake pressure, wherein the second control piston can adjust the valve body axially as a function of the parking-brake control pressure and/or the service-brake control pressure. As a result, a setting of the spring-loaded brake pressure as a function of the respective control pressure is made possible in a simple manner.

For the redundant control of the spring-loaded brake pressure as a function of the respective service-brake control pressure, the control valve preferably interacts with a switchable switch-over valve in such a manner that the first control chamber can be connected to a service-brake valve for predetermining a service-brake control pressure in the first control chamber, or can be connected to an atmosphere for venting the first control chamber, wherein the switch-over valve is integrated in the control valve or is connected upstream of the first control input of the control valve. Only as a result is the respective service-brake control pressure conducted into the first control chamber and can indirectly act on the control arrangement. In a further switching position of the switching over valve, the atmosphere can be connected to the first control chamber for venting the first control chamber. This is the case whenever the service-brake control pressure is not intended to have any influence on the spring-loaded brake pressure, i.e. in particular whenever the brake system functions normally and therefore no redundant pneumatic activation of the rear-axle wheel brakes is required.

According to the present disclosure, furthermore an electronically controllable brake system has front-axle wheel brakes, rear-axle wheel brakes with a spring-loaded part and a membrane part, an electro-pneumatically controllable front-axle pressure modulator for outputting a front-axle brake pressure to the front-axle wheel brakes, an electronically controllable rear-axle pressure modulator for outputting a membrane-brake pressure to the membrane parts of the rear-axle wheel brakes, a central module, and an electro-pneumatic service-brake valve, wherein the service-brake valve is configured to output an electric service-brake actuating signal to the central module as a function of a service-brake braking demand, wherein the central module is connected in a signal-conducting manner to the front-axle pressure modulator and to the rear-axle pressure modulator for transmitting control signals, which are dependent on the service-brake actuating signal, to the pressure modulators, wherein the service-brake valve is furthermore configured to output a pneumatic service-brake control pressure as a function of the service-brake braking demand, wherein, in the event of redundancy, the front-axle pressure modulator is activatable via a redundancy connection with a front-axle service-brake control pressure, wherein the brake system furthermore has a parking-brake valve and the parking-brake valve outputs a parking-brake control pressure to a second control input of a control valve as a function of a parking-brake braking demand, wherein the control valve can set a spring-loaded brake pressure at a working output of the control valve as a function of the parking-brake control pressure and the working output of the control valve is connected to spring-loaded parts of the rear-axle wheel brakes for also setting the spring-loaded brake pressure at the spring-loaded parts of the rear-axle wheel brakes.

According to the present disclosure, the control valve for setting the spring-loaded brake pressure is the control valve described according to the present disclosure, wherein the service-brake valve is connectable pneumatically to a first control input of the control valve for transmitting the service-brake control pressure to the control valve and for setting a spring-loaded brake pressure at the spring-loaded parts of the rear-axle wheel brakes as a function of the parking-brake control pressure and/or of the service-brake control pressure.

Preferably, the central module is connected in a signal-conducting manner to a switch-over valve, which is integrated in the control valve or is connected upstream of the first control input, for selectively connecting the service-brake valve to the first control chamber of the control valve or the atmosphere to the first control chamber of the control valve, wherein, during normal operation without there being a defect or a failure in the electric activation of the rear-axle pressure modulator, it can be predetermined via a switching-over signal transmitted to the switching-over valve that the atmosphere is connected to the first control chamber and otherwise the service-brake valve is connected to the first control chamber. The function according to the present disclosure of the control valve can thereby be used in an advantageous manner for a redundant braking mode via the spring-loaded parts.

Preferably, the service-brake valve is formed with a single channel, and the front-axle control pressure which is supplied to the front-axle pressure modulator by the service-brake valve can also be supplied via a branch line to the first control input of the control valve, or the service-brake valve is formed with two channels, wherein a first channel is connected to the redundancy connection of the front-axle pressure modulator for pneumatically activating the front-axle pressure module with the front-axle service-brake control pressure and a second channel is connected to the first control input of the control valve for transmitting a redundancy control pressure produced in the service-brake valve to the control valve. As a result, the service-brake control pressure corresponding to the service-brake braking demand can be predetermined for the control valve in a simple manner in order also to be able to implement the service-brake braking demand redundantly via the spring-loaded parts. The single-channel design has the advantage here that the service-brake valve is formed more simply and cost-effectively because only one channel is necessary. However, the two-channel design makes it possible for the front axle and the rear axle to be able to be braked redundantly pneumatically independently of each other if the need arises.

In the method according to the present disclosure for controlling an electrically controllable brake system according to the present disclosure, when an electric defect or a failure in the electric activation of the rear-axle wheel brakes is detected, the service-brake valve is connected to the first control chamber by the membrane part, and therefore a spring-loaded brake pressure which is dependent on the service-brake control pressure can be set at the spring-loaded parts of the rear-axle wheel brakes, wherein the spring-loaded brake pressure is predetermined in the control valve as a function of a switching position of a bypass valve, wherein different compressive forces act on the first control piston depending on the switching position of the bypass valve.

Preferably, the bypass valve is switched over in the control valve as a function of a defined pressure limit in the first control chamber, wherein the first control chamber is connected to the third control chamber via the bypass valve if, during pressurization of the first control chamber with the service-brake control pressure, the service-brake control pressure exceeds the defined pressure limit, and the first control chamber is not connected to the third control chamber via the bypass valve if the service-brake control pressure falls below the defined pressure limit. This makes it possible to set a targeted characteristic in which, up to the pressure limit, there is a large change in the spring-loaded brake pressure in the event of a change in the service-brake control pressure, i.e. a high pitch, and otherwise a great difference in the pitch, e.g. a smaller pitch.

Preferably, the central module predetermines for the switch-over valve during normal operation without detection of an electric defect or a failure in the electric activation of the rear-axle wheel brakes by the membrane part, via the switching-over signal that the first control chamber is connected to the atmosphere. It can thereby be determined that the function of the control valve is not intended to be influenced during normal operation of the brake system.

BRIEF DESCRIPTION OF THE DRAWINGS

The present disclosure will be explained in more detail below with reference to the appended drawings, in which.

DETAILED DESCRIPTION OF THE DRAWINGS

Figure 1:
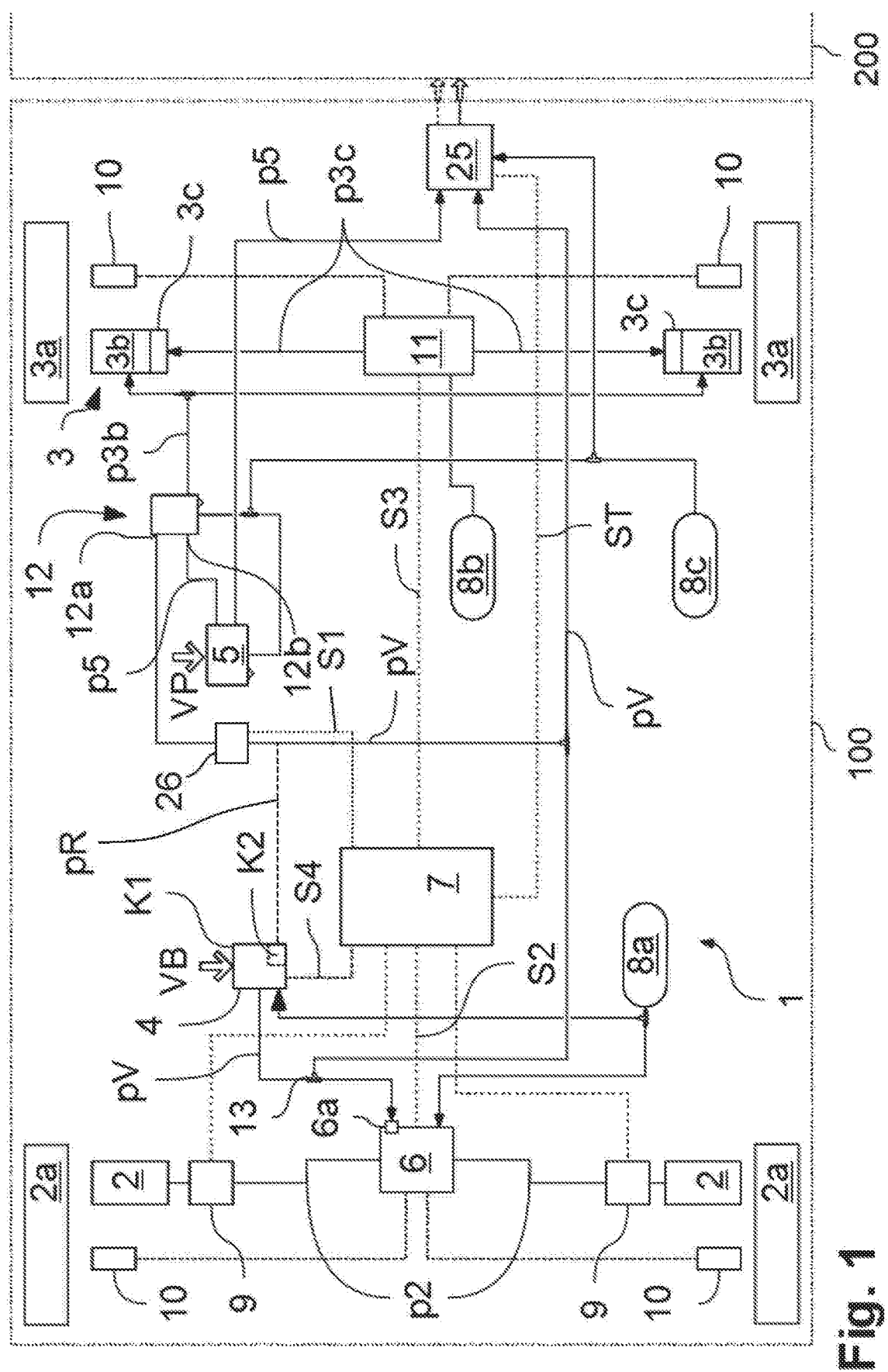
FIG. 1 shows an electronically controllable brake system with a pneumatically controllable parking brake.

FIG. 1 illustrates a vehicle combination consisting of a tractor 100 and a trailer 200 attached thereto. The tractor 100 has an at least partially electrically controllable, two-circuit brake system 1, the front-axle and rear-axle wheel brakes 2, 3 of which can be actuated by manual actuation of a service-brake valve 4 and of a parking-brake valve 5.

When the service-brake valve 4 is actuated with a certain service-brake braking demand VB, a front-axle brake pressure p2 corresponding to the specification can be built up in an electrically or pneumatically controlled manner at the front-axle wheel brakes 2. For this purpose, a front-axle service-brake control pressure pV is transmitted to a front-axle pressure-regulating module 6 via a pneumatic redundancy connection 6a by the pneumatic part of the service-brake valve 4 as a function of the level of the service-brake braking demand VB.

Furthermore, a front-axle control signal S2 is transmitted electronically to the front-axle pressure-regulating module 6 from a central module 7. The front-axle control signal S2 is formed from a service-brake actuating signal S4 which is output by the electronic part of the service-brake valve 4 to the central module 7 as a function of the service-brake braking demand VB and is processed further in the central module. The central module 7 can carry out, for example, an axle load distribution or further master functions and can generate the front-axle control signal S2 as a function thereof. As a function of the front-axle control signal S2, a front-axle brake pressure p2 for the front-axle wheel brakes 2 is produced in the front-axle pressure modulator 6, the front-axle brake pressure leading to braking of the tractor 100 in accordance with the service-brake braking demand VB and optionally the master functions. This takes place in a known manner by a corresponding electronic activation of an inlet valve/output valve combination (not illustrated) which is integrated in the front-axle pressure modulator 6 and with which pressure medium is conducted out of a first pressure-medium reservoir 8a in an appropriately pressure-reduced manner to the front-axle wheel brakes 2.

The front-axle brake pressure p2 can be modified via additional ABS control valves 9 which are arranged upstream of the front-axle wheel brakes 2. This makes it possible to oppose a locking, detected via wheel speed sensors 10, or imminent locking of the front wheels 2a. According to this embodiment, the ABS control valves 9 are activated by the central module 7 in which a corresponding intelligent ABS control logic is integrated.

During normal operation, the front-axle wheel brakes 2 are actuated in a manner controlled electrically via the central module 7. If the electronic activation of the front-axle pressure modulators 6 fails for any reason, for example because the signal transmission between the central module 7 and the front-axle pressure modulator 6 is interrupted and/or the central module 7 and/or the front-axle pressure modulator 6 has a failure on the electrical level, the front-axle wheel brakes 2 can also be controlled pneumatically via the pneumatic redundancy connection 6a as a function of the pneumatic front-axle service-brake control pressure pV. For this purpose, the front-axle service-brake control pressure pV, which is output by the service-brake valve 4, is appropriately air-quantity-boosted in the front-axle pressure modulator 6 and output as front-axle brake pressure p2 to the front-axle wheel brakes 2. As a result, a pneumatically controlled fallback level for the front-axle wheel brakes 2 is formed, and therefore, even in the event of electric failures, the tractor 100 can still be reliably braked via the front wheels 2a.

The real-axle wheel brakes 3 for braking the rear wheels 3a are configured as combined spring-loaded membrane cylinders, i.e. they have a spring-loaded part 3b and a membrane part 3c. For a conventional service-brake function, a membrane brake pressure p3c can be predetermined by a rear-axle pressure modulator 11 in an appropriately pressure-reduced manner from a second pressure medium reservoir 8b in order to actuate the membrane part 3c of the rear-axle wheel brakes 3. The rear-axle pressure modulator 11 differs here from the front-axle pressure modulator 6 by the fact that a redundancy connection for a pneumatic activation is not provided. Accordingly, the rear-axle pressure modulator 11 can merely be activated electrically, as normally also the front-axle pressure modulator 6.

To this extent, the rear-axle pressure modulator 11 is constructed comparably to the electrical level of the front-axle pressure modulator 6, and therefore a corresponding membrane brake pressure p3c can be produced and output via an inlet/outlet valve combination by the rear-axle pressure modulator 11 via a rear-axle control signal S3 output by the central module 7 as a function of the service-brake braking demand VB. A locking-protected adaptation of the membrane brake pressure p3c as a function of the measurement of the speed sensors 10 at the rear wheels 3a already takes place at the rear axle in the rear-axle pressure modulator 11 without additional ABS control valves. In this respect, the membrane brake pressure p3c is already adapted by the ABS function.

Because, in contrast to the front-axle pressure modulator 6, the rear-axle pressure modulator 11 does not have any pneumatic redundancy, a pneumatic redundancy is established via the spring-loaded part 3b of the rear-axle wheel brakes 3. The spring-loaded part 3b functions in such a manner that, in the event of a reduction in a spring-loaded brake pressure p3b acting on the spring-loaded part 3b, the wheel brakes 3 are automatically applied or the braking action at the rear wheels 3a is increased. If the spring-loaded brake pressure p3b is increased, the spring-loaded part 3b is opened further counter to spring pretensioning and a braking action at the rear wheels 3a is thereby reduced or entirely eliminated.

The spring-loaded parts 3b of the rear-axle wheel brakes 3 are conventionally used for a parking-brake function in the vehicle 100, the parking-brake function being controlled via the parking-brake valve 5 in a parking brake circuit. If, accordingly, a certain parking-brake braking request VP is specified by the driver via the pneumatic parking-brake valve 5, a corresponding parking-brake control pressure p5 is output by the parking-brake valve 5 and transmitted to a second control input 12b of a control valve 12. The control valve 12 ensures air quantity boosting of the parking-brake control pressure p5, and therefore a spring-loaded brake pressure p3b is output via a working output 12c (see FIGS. 2a, 2b) to the spring-loaded part 3b of the rear-axle wheel brake 3, the spring-loaded part leading to braking of the vehicle 100 in accordance with the parking-brake braking request VP.

If the driver specifies via the parking-brake braking request VP that the vehicle is intended to be parked, i.e. the full braking action is intended to be achieved via the spring-loaded parts 3b, the line between the parking-brake valve 5 and the control valve 12 is vented, and therefore a parking-brake control pressure p5 corresponding to the atmospheric pressure prevails at the second control input 12b of the control valve 12. The spring pretensioning therefore ensures application of the spring-loaded parts 3b. If the parking-brake valve 5 is in a travel position or any desired intermediate position, a correspondingly high parking-brake control pressure p5 is specified at the second control input 12b from the third pressure medium reservoir 8c, and therefore the spring-loaded parts 3b are continuously opened by the spring-loaded brake pressure p3b counter to the spring pretensioning.

According to the present disclosure, the control valve 12 is expanded in a first step in such a manner that, in addition to the described parking-brake function, a redundant pneumatic activation of the rear-axle wheel brakes 3 can also take place—in this case via the spring-loaded part 3b. This takes place in particular whenever the rear-axle pressure modulator 11 and/or the central module 7 and/or the electric connection in between has an electric defect or failure, that is to say a braking operation of the rear wheels 3a can no longer take place in a manner controlled electrically by the central module 7.

For this purpose, the front-axle service-brake control pressure pV output by the pneumatic part of the service-brake valve 4 in the event of a manual braking operation is guided via a branch line 13 and a switching valve 26 to a first control input 12a of the control valve 12, wherein the control valve 12 produces a spring-loaded brake pressure p3b which is inverse to the front-axle service-brake control pressure pV and is air-quantity boosted, and outputs same via the working output 12c (see FIGS. 2a, 2b) to the spring-loaded part 3b of the wheel brakes 3. The air-quantity boosting of the parking-brake control pressure p5 and of the front-axle service-brake control pressure pV takes place in the control valve 12 by pressure being supplied by the third pressure medium reservoir 8c.

Alternatively, a redundancy service-brake control pressure pR corresponding to the service-brake braking demand VB may be supplied to the control valve 12 via the switching valve 26 instead of the front-axle service-brake control pressure pV, the redundancy service-brake control pressure pR being produced and output in the service-brake valve 4 in a manner comparable to the front-axle service-brake control pressure pV. The service-brake valve 4 is then constructed with two channels, wherein the front-axle service-brake control pressure pV for pneumatically activating the front-axle pressure modulator 6 is produced and output via a first channel K1 and the redundancy service-brake control pressure pB for pneumatically activating the control valve 12 is produced and output via a second channel K2. FIG. 1 schematically illustrates this optional embodiment by means of a further dashed channel K2 at the service-brake valve 4 and a pneumatic control line from the service-brake valve 4 to the line which leads to the first control input 12a of the control valve 12. In the dashed embodiment, the supply of the front-axle service-brake control pressure pV via the branch line 13 to the switching valve 26 then ceases. Only the redundant activation of the control valve 12 via the front-axle service-brake control pressure pV, which corresponds to the activation by the redundancy service-brake control pressure pR, will be described below.

In certain situations, the control valve 12 according to the present disclosure therefore additionally takes on the task of inverting and air-quantity boosting of the front-axle service-brake control pressure pV, and therefore this enables a redundant pneumatic activation of the rear-axle wheel brakes 3 to take place. In order to give the parking-brake braking demand VP higher priority, the control valve 12 according to this embodiment is configured in such a manner that the implementation of the parking-brake braking demand VP or the air quantity boosting of the parking-brake control pressure p5 has precedence over the inverting and air-quantity boosting of the front-axle service-brake control pressure pV.

Furthermore, it is specified in this embodiment that a pneumatic activation of the control valve 12 with the front-axle service-brake control pressure pV only leads to a corresponding spring-loaded brake pressure p3b being output to the spring-loaded part 3b when an electric activation via the rear-axle pressure modulator 11 and a corresponding output of the membrane brake pressure p3c fails. Otherwise, the front-axle service-brake control pressure pV continues to be transmitted to the control valve 12 via the first control input 12a without any effect on the spring-loaded part 3b of the rear-axle wheel brakes 3.

Figure 2A:
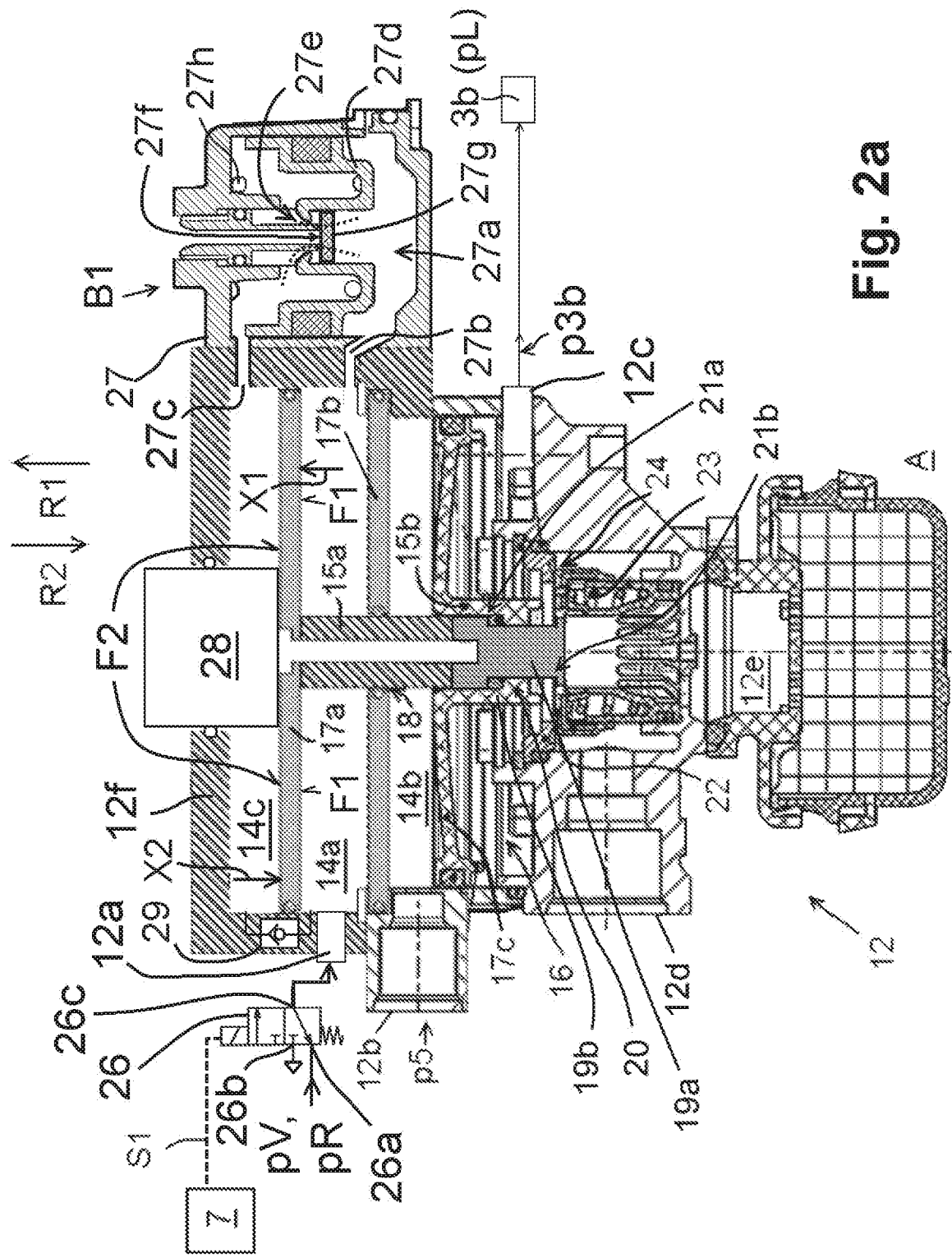
FIGS. 2a, 2b show detailed views of a control valve according to the present disclosure with an integrated bypass valve in two switching positions.
Figure 2B:
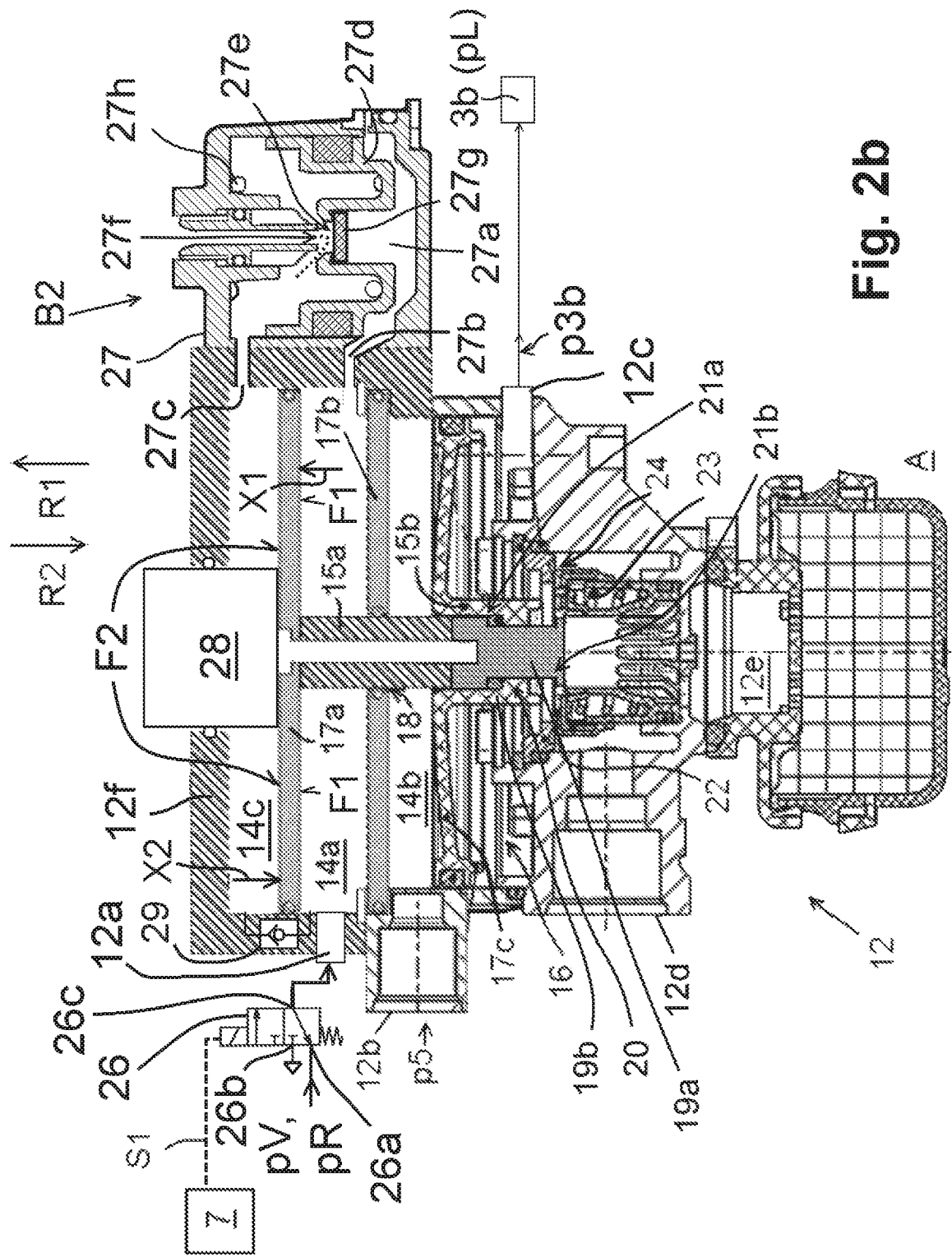

In order to achieve all this, the control valve 12 illustrated in FIGS. 2a and 2b is provided. The control valve 12 consists of the control inputs 12a, 12b, via which the front-axle service-brake control pressure pV or the redundancy service-brake control pressure pR or the parking-brake control pressure p5 are predetermined, and the working output 12c which outputs the spring-loaded brake pressure 3b to the spring-loaded part 3b. Furthermore, a supply connection 12d is provided which is connected to the third pressure-medium reservoir 8c and ensures that the pressure medium is supplied to the control valve 12. The control valve 12 can be connected to the atmosphere A via a venting connection 12e.

The control valve 12 furthermore, has three control chambers 14a, 14b, 14c and two control pistons 15a, 15b as functional elements, wherein the two control pistons 15a, 15b are operatively connected to each other and, as is described in more detail, can carry each other along at least in regions in certain situations. By means of an axial movement of the two control pistons 15a, 15b, a pressure chamber 16 of the control valve 12 can be connected to the supply connection 12d or to the venting connection 12e. The pressure chamber 16 is furthermore connected to the working output 12c, and therefore, depending on the axial position of the two control pistons 15a, 15b, a pressure increase (via 12d) or a pressure reduction (via 12e) of the spring-loaded brake pressure p3b prevailing at the working output 12c can take place. This takes place according to the following principle:

A first control piston 15a is connected to a first wall 17a and is mounted in an axially displaceable manner in an opening 18 in a second stationary wall 17b of the control valve 12. The opening 18 like the first wall 17a is sealed, and therefore a first control chamber 14a is formed between the first wall 17a and the second wall 17b and a valve housing 12f of the control valve 12, the control chamber being able to be enlarged and reduced by axial displacement of the first control piston 15a and of the first wall 17a connected thereto. The first control chamber 14a is connected to the first control input 12a of the control valve 12 in order to be able to conduct the pressure medium having the front-axle service-brake control pressure pV into the first control chamber 14a.

The connection between the first control chamber 14a and the first control input 12a or the service-brake valve 4 and the first control input 12a can be blocked in a targeted manner via a switching valve 26, for example an electrically controllable 3/2-way directional control valve. For this purpose, the switching valve 26 is either arranged as part of the control valve 12 between the first control input 12a and the first control chamber 14a or—in analogy to FIG. 1—is connected upstream of the control valve 12 or the first control input 12a. FIGS. 2a and 2b schematically illustrate a 3/2-way directional control valve, which is connected upstream of the control valve 12, as the switching valve 26. The function described below of the switching valve 26 can be applied in an analogous manner to the switching valve 26 integrated in the control valve 12.

The pressure medium having the front-axle service-brake control pressure pV or the redundancy service-brake control pressure pR is supplied to the switching valve 26 from the service-brake valve 4 via a first switching-valve input 26a. A second switching-valve input 26b is connected to the atmosphere A. Depending on the switching position of the switching valve 26, the pressure medium having the front-axle service-brake control pressure pV or the redundancy service-brake control pressure pR or the atmospheric pressure can be output to the first control chamber 14a via a switching-valve output 26c.

The switching valve 26 can be switched over in an electrically controlled manner in order to open up or to block the front-axle service-brake control pressure pV. For this purpose, the switching valve 26 is connected in a signal-conducting manner to the central module 7. During normal operation without the presence of an electric fault, the central module 7 provides the command for switching over the switching valve 26 via a switching-over signal S1. The switching valve 26 is preferably switched over here during each braking actuation, i.e. whenever a certain service-brake braking demand VB is present at the service-brake valve 4. The switching over takes place in such a manner that an admission of the front-axle service-brake control pressure pV into the first control chamber 14a is blocked when a braking actuation is present. Instead, the first control chamber 14a is connected by the position of the switching valve 26 to the atmosphere A. As a result, the first control chamber 14a is under atmospheric pressure, and therefore the effect achieved during a braking actuation during normal operation is that the front-axle service-brake control pressure pV does not influence the function of the control valve 12. If the service-brake valve 4 is unactuated, the switching valve 26 is switched over in such a manner that the pressure medium having the front-axle service-brake control pressure pV is admitted into the first control chamber 14a via the first control input 12a. Because, however, the service-brake valve 4 in the unactuated position predetermines an atmospheric pressure, the first control chamber 14a is also then connected to the atmosphere A such that no influencing of the control valve 12 thereby also arises.

If the central module 7 fails or if another electric fault is present in the rear-axle pressure modulator 11 or when the rear-axle pressure modulator 11 is activated, no switching-over signal S1 is transmitted to the switching valve 26 during actuation of the brakes. The switching valve 26 is then automatically switched in such a manner that the front-axle service-brake control pressure pV, which is then greater than the atmospheric pressure, is also admitted when the brakes are actuated into the first control chamber 14a via the switching-valve output 26c. The function of the control valve 12 can therefore be influenced, as described further below, by the front-axle service-brake control pressure pV when there is an electric failure or defect.

Furthermore, a third control chamber 14c is defined above the first wall 17a and below the valve housing 12f. The third control chamber 14c can be connected to the first control chamber 14a via a bypass valve 27 in order, during the redundant braking mode, when the front-axle service-brake control pressure pV is admitted into the first control chamber 14a, to permit a certain predetermined behavior of the control valve 12. This is implemented as follows:

The first control chamber 14a of the control valve 12 is connected via a first connecting channel 27b to a bypass pressure chamber 27a such that the pressure medium located in the first control chamber 14a can also pass into the bypass pressure chamber 27a and can interact there with a bypass control piston 27d. In the open first switching position B1 of the bypass valve 27 that is illustrated in FIG. 2a, the bypass pressure chamber 27a is connected via a second connecting channel 27c to the third control chamber 14c, wherein the pressure medium located in the first control chamber 14a can pass through an open bypass intermediate chamber 27e out of the first connecting channel 27b into the second connecting channel 27c and into the third control chamber 14c. The bypass valve 27 is configured here in such a manner that the pressure medium can flow through the open bypass intermediate chamber 27e in the direction of the dashed line in FIG. 2a.

The bypass valve 27 furthermore has a pressure-controlled bypass control piston 27d which can be adjusted upward and downward into the first and second directions R1, R2, respectively. In the open first switching position B1 that are shown in FIG. 2a, the bypass control piston 27d owing to pressurization in the first control chamber 14a or in the bypass pressure chamber 27a is adjusted upward in the first direction R1. As a result, the bypass intermediate chamber 27e is opened and the pressure medium can flow through the latter. At the same time, an inlet opening 27f of the bypass valve 27 lies against a closure piston 27g in such a manner that the inlet opening 27f is closed and is therefore not connected to the first or to the second connecting channel 27b, 27c. The inlet opening 27f is connected here to the atmosphere A and therefore serves for venting, wherein venting in the first switching position B1 is prevented by the inlet opening 27f lying against the closure piston 27g.

In a closed second switching position B2 illustrated in FIG. 2b, because there is no pressurization in the first control chamber 14a or in the bypass pressure chamber 27a, the bypass control piston 27d automatically drops downward in the second direction R2, wherein, for this purpose, the bypass control piston 27d is pressed downward in a manner assisted by a bypass spring 27h. In this closed second switching position B2, the bypass intermediate chamber 27e is closed by the closure piston 27g, and therefore the first and the second connecting channel 27b, 27c, and therefore also the first and the third control chambers 14a, 14c are no longer connected to each other. At the same time, the inlet opening 27f is opened up, and therefore the third control chamber 14c is connected to the atmosphere A and is therefore vented (dashed line in FIG. 2b).

The spring force of the bypass spring 27h and the setting of the bypass control piston 27d are coordinated with each other here in such a manner that the bypass valve 27 merges from the closed second switching position B2 (FIG. 2b) into the open first switching position B1 (FIG. 2a) when a defined switching pressure pU is exceeded in the bypass pressure chamber 27a. The switching pressure pU corresponds here to the pressure acting in the first control chamber 14a of the control valve 12 (atmospheric pressure or front-axle service-brake control pressure pV or redundancy service-brake control pressure pR), and therefore it can be controlled by means of this pressure whether the bypass valve 27 is open or closed or whether the third control chamber 14c is under atmospheric pressure (second switching position B2) or is charged with the same pressure as the first control chamber 14a. The bypass valve 27 is therefore constructed in such a manner that, in the non-redundant braking mode, i.e. when the central module 7 is functioning and there is atmospheric pressure in the first control chamber 14a, the bypass valve is in the closed second switching position B2 in which the third control chamber 14c is also vented. Therefore, in the non-redundant braking mode, the control valve 12 is not influenced by the first control piston 15a.

The function of the control valve 12 in the non-redundant braking mode is as follows: a third wall 17c of the second control piston 15b together with the stationary second wall 17b defines a second control chamber 14b. In this exemplary embodiment, the first control piston 15a protrudes into the latter. In its lower region, the first control piston 15a enters with a first shaft 19a into a hollow-cylindrical second shaft 19b of the second control piston 15b. The diameter of the first shaft 19a is reduced in regions here in the region of a shaft narrowing 20 of the second shaft 19b. As a result, the first control piston 15a can move within a certain region relative to the second control piston 15b. The region is defined here in such a manner that, in the non-redundant braking mode, the second control piston 15b can be moved because of the parking-brake braking demand VP without being influenced by the first control piston 15a, i.e. by friction of the seals. As soon as the first shaft 19a during its movement passes with a first upper contact surface 21a or a second lower contact surface 21b toward the shaft narrowing 20 of the second shaft 19b, the two control pistons 15a, 15b move together, as explained in detail further below.

The second control chamber 14b is connected to the second control input 12b, and therefore the parking-brake control pressure p5 prevailing at the second control input 12b also acts in the second control chamber 14b. Depending on the level of the parking-brake control pressure p5, the second control piston 15b is displaced axially upward in a first direction R1 or downward in a second direction R2 via the third wall 17c (independently of the first control piston 15a in the non-redundant braking mode). The adjustment of the second control piston 15b upward in the first direction R1 can take place here either owing to suction (at a low parking-brake control pressure p5) from the second control chamber 14b and/or by a spring (not illustrated) which forces the second control piston 15b in the first direction R1 in the vented state.

When the parking-brake valve 5 is actuated (see FIG. 1), the second control input 12b is first of all vented, and therefore a parking-brake control pressure p5 corresponding to the atmospheric pressure is present in the second control chamber 14b. This results in the state which is illustrated in FIGS. 2a, 2b and in which the second control piston 15b is adjusted axially upward because of the small action of pressure on the third wall 17c. The pressure chamber 16 is thereby connected to the venting connection 12e, and the working output 12c is likewise vented, i.e. there is a small spring-loaded brake pressure p3b, and therefore the spring-loaded parts 3b of the rear-axle wheel brakes 3 are applied by the spring pretensioning. At the same time, the bypass control piston 27d is adjusted downward by the bypass spring 27h because, owing to the switching position of the switching valve 26 in the non-redundant braking mode, atmospheric pressure is permanently present in the first control chamber 14a. The same pressures therefore prevail in the first and in the third control chamber 14a, 14c. The first control piston 15a and the second control piston 15b are not influenced as a result.

When parking-brake control pressure p5 increases in the second control chamber 14b because of a withdrawal of the actuation of the parking-brake valve 5 (see FIG. 1), the second control piston 15b is pressed axially downward via the third wall 17c until it comes with its lower region against a valve body 22 in a sealing manner from a certain axial adjustment, and therefore, in comparison to the state in FIGS. 2a, 2b, the connection between the working output 12c and the venting connection 12e is separated via the pressure chamber 16. The pressure chamber 16 is then only still connected to the working output 12c. The spring-loaded brake pressure p3b is thereby maintained. The first control piston 15a is not carried along here because the shaft narrowing between the two contact surfaces 21a, 21b of the so far non-moving first shaft 19a is adjusted.

During a further increase in pressure of the parking-brake control pressure p5, the second control piston 15b presses the valve body 22 downward counter to the force of a compression spring 23, as a result of which a passage 24 opens, and therefore a connection between the supply connection 12d and the working output 12c is produced via the pressure chamber 16. As a result thereof, the spring-loaded brake pressure p3 is increased and the spring-loaded part 3b is opened counter to the spring force, and therefore the rear-axle wheel brakes 3 deploy only a little braking action, if any at all. In this case, until a maximum parking-brake control pressure p5 is reached, the shaft narrowing 20 does not pass against the lower contact surface 21a of the first shaft 19a, and therefore the first control piston 15a is not carried along during an increase in pressure up to the maximum parking-brake control pressure p5.

In this state, the bypass control piston 27d continues to be adjusted downward by the bypass spring 27h and accordingly is not influenced by an increasing parking-brake control pressure p5 because, owing to the switching position of the switching valve 26 in the non-redundant braking mode, atmospheric pressure continues to be present in the first control chamber 14a and, via a nonreturn valve 29, also in the third control chamber 14c. The braking action is therefore then still not influenced either.

Owing to the arrangement of the lower contact surface 21a on the first shaft 19a and the shaft narrowing 20 on the second shaft 19b, the control function just described, i.e. the connection of the venting connection 12e to the working output 12c for applying the spring-loaded part 3b or the connection of the supply connection 12e to the working output 12c for opening the spring-loaded part 3b can likewise also take place by means of the change in the pressure in the first control chamber 14a. This can take place during an absence of the switching-over signal S1 (redundant braking mode) as already indicated above:

An increase in pressure in the first control chamber 14a as a result of a redundant braking request brings about an axial adjustment of the first control piston 15a upward in the first direction R1. The second control piston 15b is likewise drawn here at the same time in the first direction R1 as soon as the lower contact surface 21b of the first shaft 19a lies from below against the shaft narrowing 20 because of the increase in pressure in the first control chamber 14a. This is the case, for example, if, during a redundant braking request via the service-brake valve 4, there is no actuation of the parking-brake valve 5 and therefore there is a high pressure in the second control chamber 14b, or there is a lower actuation via the parking-brake valve 5 (parking-brake braking demand VP) than via the service-brake valve 4 (service-brake braking demand VB).

As a result, the front-axle service-brake control pressure pV can be inverted because, in the event of a high front-axle service-brake control pressure pV, the second control piston 15b is lifted off from the valve body 22 when the control piston is carried along by the first control piston 15a and the working output 12c is therefore connected to the venting connection 12e and the spring-loaded parts 3b can therefore be applied via a low spring-loaded brake pressure p3b. By contrast, as the front-axle service-brake control pressure pV becomes lower, the volume in the first control chamber 14a becomes smaller, and therefore a connection of the working output 12c to the supply connection 12d as a result of an axial adjustment of the two control pistons 15a, 15b downward in the second direction R2 is produced, which leads to an increasing spring-loaded brake pressure p3b and therefore to release of the spring-loaded parts 3b of the rear-axle wheel brakes 3. Therefore, owing to the arrangement of the two control pistons 15a, 15b with respect to each other, an opposed adjustment of the second control piston 15a, 15b can be brought about when the service-brake control pressure pV and the parking-brake control pressure p5 are increased.

The effect which can be achieved by the just-described functionality of the control valve 12 is that, despite a redundant service-brake braking demand VB (no switching-over signal S1), a correspondingly present parking-brake braking demand VP actually leads to braking or stopping of the vehicle 100 in the, for example parked, state. This is achieved by the oppositely acting control pistons 15a, 15b and the compression spring 23 which is in effect. If, for example, in the event of a full parking-brake braking demand VP, a low parking-brake control pressure p5 is present in the second control chamber 14b, the working output 12c would be connected to the supply connection 12c in order to release the spring-loaded parts 3b. That is to say, the first control piston 15a would have to ensure an axial movement of the second control piston 15b downward in FIGS. 2a, 2b. This can take place, if at all, only if a very low front-axle service-brake control pressure pV is present in the first control chamber 14a because otherwise axial raising of the first control piston 15a takes place. If the starting point is from a low front-axle service-brake control pressure pV—corresponding to a small redundant service-brake braking demand VB—which cannot drop below the atmospheric pressure currently present in the second control chamber 14b, the control pressure is not capable of ensuring a sufficiently high compressive force for compressing the compression spring 23. The compression spring 23 should be accordingly configured. Release of the spring-loaded parts 3b is thereby prevented.

If, conversely, no parking-brake braking demand VP is present, the second control piston 15b is adjusted axially downward during normal operation, and therefore a maximum spring-loaded brake pressure p3b is in action. The front-axle service-brake control pressure pV prevailing in the first control chamber 14a during a redundant service-brake braking demand VB (no switching-over signal S1) then, counter to the axial movement, draws the first control piston 15a and, via the lower contact surface 21b and the shaft narrowing 20, also the second control piston 15b upward again to a certain extent such that the spring-loaded brake pressure p3b is dissipated again and a partial application of the spring-loaded parts 3b is achieved. The forces acting on the two control pistons 15a, 15b by means of the prevailing control pressures p5, pV are therefore combined, and therefore a corresponding braking action is achieved by the spring-loaded parts 3b.

The action of a certain front-axle service-brake control pressure pV on the spring-loaded parts 3b in the pneumatic redundancy situation can be set in a targeted manner by the bypass valve 27. For example, it is possible to set the fact that the bypass control piston 27d lifts off from the closure piston 27g only when a pressure limit pG prevailing in the first control chamber 14a is exceeded, and the bypass valve 27 therefore merges into the open switching position B1 according to FIG. 2a. As a result, at values which are lower than the pressure limit pG (closed switching position B2 according to FIG. 2b), the front-axle service-brake control pressure pV acts only in the first control chamber 14a while the third control chamber 14c is under atmospheric pressure via the bypass inlet 27f. Accordingly, only a first compressive force X1 acts on the first control piston 15a in the first direction R1, and therefore the front-axle service-brake control pressure pV is converted directly into an inverted spring-loaded brake pressure p3b.

The pressure limit pG can be set, for example, to between 0.5 bar and 0.7 bar, wherein, when the pressure limit pG is set, a spring-loaded brake pressure p3b is applied from the control valve 12 as the front-axle service-brake control pressure pV, the spring-loaded brake pressure corresponding to a release pressure pL of the spring-loaded parts 3b of the rear-axle wheel brakes 3. The release pressure pL indicates here the spring-loaded brake pressure p3b from which the spring-loaded parts 3b actually open and therefore deploy a braking action. The release pressure pL results here from the spring characteristics of the respective spring-loaded part 3b and an idling travel which is dependent thereon. These can vary for different spring-loaded brakes, and therefore the pressure limit pG can also vary.

Figure 3:
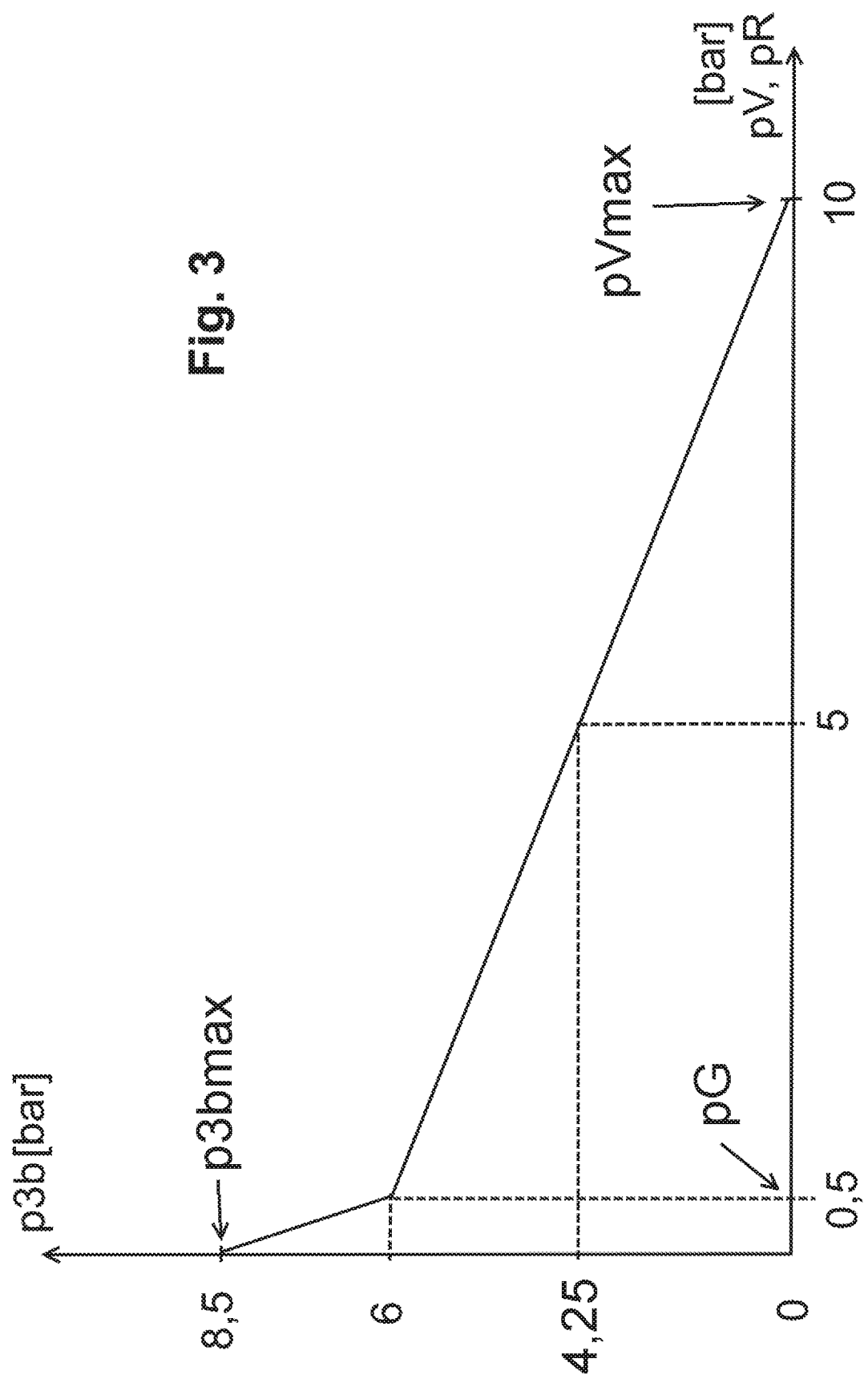
FIG. 3 shows an actuating characteristic curve for redundant braking actuation via the control valve according to FIGS. 2a, 2b.

Because the front-axle service-brake control pressure pV up to the pressure limit pG acts only on the first control piston 15a, the spring-loaded brake pressure p3b applied by the control valve 12 very rapidly achieves the release pressure pL during a redundant actuation of the brakes, which is illustrated by way of example in FIG. 3 by a sharply dropping flank. The actuation path within which the driver does not yet feel any braking action during redundant braking can therefore be reduced.

From the pressure limit pG, the action of the front-axle service-brake control pressure pV on the bypass control piston 27d is of such a magnitude that the bypass control valve 27d lifts off in the first direction R1 from the closure piston 27g counter to the spring action of the bypass spring 27h (open switching position according to FIG. 2a) and therefore a connection between the first and the third control chambers 14a, 14c is produced. The effect achieved by this is that the first compressive force X1 now acts on the first control piston 15a in the first direction R1 (downward from the first control chamber 14a in FIGS. 2a, 2b) and at the same time a second compressive force X2 also acts in the second direction R2 (upward from the third control chamber 14c in FIGS. 2a, 2b). The movement of the first control piston 15a is therefore dependent on the front-axle service-brake control pressure pV and the area ratio between a first surface F1 of the first wall 17a, the surface facing the first control chamber 14a, and a second surface F2 of the first wall 17a, the surface facing the third control chamber 14c.

At an area ratio of F1:F2=1:1, the two compressive forces X1, X2 on the first control piston 15a would precisely cancel each other out, and therefore no movement of the first control piston 15a results. In order to avoid this, an additional piston element 28 is provided in the third control chamber 14c, the piston element being connected to the first control piston 15a or the first wall 17a and reducing the second surface F2 on which the front-axle service-brake control pressure pV can act in the second direction R2. As a result, in the state of the bypass control piston 27d lifted off from the closure piston 27g or in the open switching position B1, a higher first compressive force X1 always acts on the first surface F1, and therefore, when the front-axle service-brake control pressure pV increases, the first control piston 15a is adjusted in the first direction R1, which results in an increased spring-loaded brake pressure p3b.

As is apparent from FIG. 3, because of the compressive forces X1, X2 acting from below and above on the first control piston 15a, the increase is lower than for front-axle service-brake control pressures pV which are lower than the pressure limit pG. By means of the volume of the piston element 28, for pV>pG, the transmission between the front-axle service-brake control pressure pV and the applied spring-loaded brake pressure p3b can therefore be set in a targeted manner in the redundant braking mode and therefore a pressure modulation of the spring-loaded brake pressure p3b can take place. It is therefore possible in addition to set the fact that, for example for a front-axle service-brake control pressure pV which corresponds to half of a maximum front-axle service-brake control pressure pVmax of, for example, 10 bar, half of a maximum spring-loaded brake pressure p3bmax of, for example, 8.5 bar is also applied. A clearly defined control valve characteristic can therefore be predetermined in order to improve the braking sensation in the event of redundancy.

In order to enable the first control piston 15a to be reset after the spring-loaded brake pressure p3b decreases or the bypass valve 27 closes, the first and the third control chambers 14a, 14c are connected to a nonreturn valve 29 opening toward the first control chamber 14a.

An electric and/or pneumatic transmission of the front-axle service-brake control pressure pV and of the parking-brake control pressure p5 or an electric trailer control signal ST can also take place in a conventional manner via a trailer control valve 25 (see FIG. 1) in order also to be able to brake the trailer 200.

Figure 4:
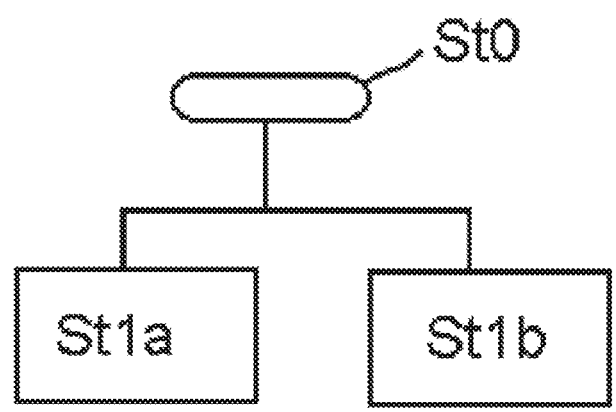
FIG. 4 shows a flow diagram of the method according to the present disclosure.

The effect can therefore be achieved according to the present disclosure according to FIG. 4 that, in a method, it is first of all checked whether the central module 7 has a defect and/or the connection to the rear-axle pressure modulator 11 has a defect and therefore electric activation of the rear-axle wheel brakes 3 is not possible (St0). If this is not the case, in a first alternative step St1a, it is specified to the switching valve 26 via the switching-over signal S1 that introduction of the front-axle service-brake control pressure pV or of the redundancy service-brake control pressure pR into the first control chamber 14a is prevented. The first control chamber 14a and also the third control chamber 14c are therefore connected to the atmosphere A and do not influence the implementation of the parking-brake braking demand VP. If, however, there is a defect in the electric activation of the rear-axle pressure modulator 11, there is no switching-over signal S1 and, in a second alternative step St1b, the front-axle service-brake control pressure pV or the redundancy service-brake control pressure pR is admitted into the first control chamber 14a. If there is no parking-brake braking demand VP, when there is a service-brake braking demand VB a braking action corresponding to the front-axle service-brake control pressure pV or to the redundancy service-brake control pressure pR is implemented, as described, via the spring-loaded parts 3b, wherein the spring-loaded brake pressure p3b is predetermined in the control valve 12 as a function of a switching position B1, B2 of a bypass valve 27, wherein, depending on the switching position B1, B2 of the bypass valve 27, different compressive forces X1, X2 act on the first control piston 15a. When there is a parking-brake braking demand VP and simultaneous redundant pneumatic activation of the control valve 12 with the front-axle service-brake control pressure pV or the redundancy service-brake control pressure pR, i.e. when a switching-over signal S1 is not present, the redundant implementation of the service-brake braking demand VB at the rear wheels 3b is prevented automatically, as described.

While the above description constitutes the preferred embodiments of the present invention, it will be appreciated that the invention is susceptible to modification, variation and change without departing from the proper scope and fair meaning of the accompanying claims.

LIST OF REFERENCE CHARACTERS (PART OF THE DESCRIPTION)

1 Brake system
2 Rear-axle wheel brakes
2a Front wheels
3 Rear-axle wheel brakes
3a Rear wheels
3b Spring-loaded part of the rear-axle wheel brakes 3
3c Membrane part of the rear-axle wheel brakes 3
4 Service-brake valve
5 Parking-brake valve
6 Front-axle pressure modulator
6a Redundancy connection
7 Central module
8a First pressure-medium reservoir
8b Second pressure-medium reservoir
8c Third pressure-medium reservoir
9 ABS control valves
10 Wheel speed sensors
11 Rear-axle pressure modulator
12 Control valve
12a First control input of the control valve 12
12b Second control input of the control valve 12
12c Working output
12d Supply connection
12e Venting connection
12f Valve housing
13 Branch line
14a First control chamber
14b Second control chamber
14c Third control chamber
15a First control piston
15b Second control piston
16 Pressure chamber
17a First wall
17b Second wall
17c Third wall
18 Opening
19a First shaft of the first control piston 15a
19b Second shaft of the second control piston 15b
20 Shaft narrowing
21a Upper contact surface of the first shaft 19a
21b Lower contact surface of the first shaft 19a
22 Valve body
23 Compression spring
24 Passage
25 Trailer control valve
26 Switching valve
26a First switching-valve input
26b Second switching-valve input
26c Switching-valve output
27 Bypass valve
27a Bypass pressure chamber 27a
27b First connecting channel
27c Second connecting channel
27d Bypass control piston
27e Bypass intermediate chamber
27f Bypass inlet
27g Closure piston
27h Bypass spring
28 Piston element
29 Nonreturn valve
100 Tractor
200 Trailer
A Atmosphere
B1 First switching position of the bypass valve 27
B2 Second switching position of the bypass valve 27
F1 First surface of the first wall 17a
F2 Second surface of the first wall 17a
K1 First channel of the service-brake valve 4
K2 Second channel of the service-brake valve 4
p2 Front-axle brake pressure
p3b Spring-loaded brake pressure
p3bmax Maximum spring-loaded brake pressure
p3c Membrane brake pressure
p5 Parking-brake control pressure
pL Release pressure
pG Pressure limit
pR Redundancy service-brake control pressure
pV Front-axle service-brake control pressure
pVmax Maximum front-axle service-brake control pressure
R1 First direction
R2 Second direction
S1 Switching-over signal
S2 Front-axle control signal
S3 Rear-axle control signal
S4 Service-brake actuating signal
ST Trailer control signal
VB Service-brake braking demand
VP Parking-brake braking demand
X1 First compressive force on the first control piston 15a
X2 Second compressive force on the first control piston 15a
St0, St1a, St1b Steps of the method

What is claimed is:

1. A control valve (12) for applying a spring-loaded brake pressure (p3b) to spring-loaded parts (3b) of a rear-axle wheel brake (3), the control valve comprising a first control input and a second control input and a first control chamber, a second control chamber, and a third control chamber,
wherein the control valve (12) is configured to be pneumatically actuated via the second control input (12b) with a parking-brake control pressure (p5), wherein the parking-brake control pressure (p5) is configured to act in such a manner on control arrangement (14b, 15b, 17c, 22, 23, 24) arranged in a valve housing (12f) of the control valve (12) that a spring-loaded brake pressure (p3b) arises at a working output (12c) of the control valve (12) as a function of the parking-brake control pressure (p5) for implementing a parking-brake braking demand (VP) with the spring-loaded parts (3b) of the rear-axle wheel brakes (3),
wherein the control valve (12) is further configured to receive, via the first control input (12a), a service-brake control pressure (pV; pR) which depends on a service-brake braking demand (VB), wherein the first control input (12a) is connectable to the first control chamber (14a), wherein the first control chamber (14a) is adjustable and operatively connected, via a first control piston (15a), to the control arrangement (14b, 15b, 17c, 22, 23, 24) in the control valve (12) and, during an adjustment of the first control chamber (14a) as a result of pressurization with the service-brake control pressure (pV; pR), the spring-loaded brake pressure (p3b) at the working output (12c) is configured to be set as a function of the service-brake control pressure (pV; pR) and of the parking-brake control pressure (p5), wherein the first control piston (15a) is furthermore operatively connected to the third control chamber (14c), wherein a first compressive force (X1) acts on the first control piston (15a) in a first direction (R1) when the first control chamber (14a) is pressurized with the service-brake control pressure (pV; pR), and a second compressive force (X2) in a second direction (R2) opposite to the first direction (R1) acts on the first control piston (15a) when the third control chamber (14c) is pressurized with the same service-brake control pressure (pV; pR), wherein the control valve further comprises a switchable bypass valve (27) and the first control chamber (14a) is selectively connectable to the third control chamber (14c) depending on a switching position (B1, B2) of the switchable bypass valve (27) for selectively charging the first and third control chambers (14a, 14c) with the same service-brake control pressure (pV; pR).

2. The control valve (12) as claimed in claim 1, wherein the first control chamber (14a) is separated from the third control chamber (14c) by a first wall (17a) connected to the first control piston (15a) and the service-brake control pressure (pV; pR) acts on a first surface (F1) of the first wall (17a) in the first control chamber (14a) and, depending on the switching position (B1, B2) of the bypass valve (27), the service-brake control pressure (pV; pR) acts on a second surface (F2) of the first wall (17a) in the third control chamber (14c).

3. The control valve (12) as claimed in claim 2, wherein the first surface (F1) is larger than the second surface (F2), and when the first control chamber (14a) is pressurized with the service-brake control pressure (pV; pR), a first compressive force (X1) acts on the first control piston (15a) in the first direction (R1), the compressive force being larger than a second compressive force (X2) on the first control piston (15a) in the second direction (R2) during simultaneous pressurization of the third control chamber (14c) with the same service-brake control pressure (pV; pR).

4. The control valve (12) as claimed in claim 3, wherein a piston element (28) is arranged on the second surface (F2) of the first wall (17a), wherein the piston element (28) projects through the third control chamber (14c) in such a manner that the second surface (F2) on the first wall (17a) is reduced, wherein the second compressive force (X2) on the first control piston (15a) during pressurization of the third control chamber (14c) with the service-brake control pressure (pV; pR) is brought about only by the action of the service-brake control pressure (pV; pR) on the second surface (F2) which is reduced by the piston element (28).

5. The control valve (12) as claimed in claim 1, wherein the bypass valve (27) is adapted to be switched over as a function of a defined pressure limit (pG) in the first control chamber (14a), wherein the first control chamber (14a) is connected to the third control chamber (14c) via the bypass valve (27) when, during pressurization of the first control chamber (14a) with the service-brake control pressure (pV; pR), the service-brake control pressure (pV; pR) exceeds the defined pressure limit (pG), and the first control chamber (14a) is disconnected from the third control chamber (14c) via the bypass valve (27) when the service-brake control pressure (pV; pR) falls below the defined pressure limit (pG).

6. The control valve (12) as claimed in claim 1, wherein the bypass valve (27) is adapted to be switched over by pressure control.

7. The control valve (12) as claimed in claim 6, wherein the bypass valve (27) has a bypass control piston (27d), wherein the bypass control piston (27d) is configured to be adjusted depending on a switching pressure (pU) acting in a bypass pressure chamber (27a), wherein the switching pressure (pU) corresponds to the pressure in the first control chamber (14a), for switching over the bypass valve (27).

8. The control valve (12) as claimed in claim 7, wherein the bypass control piston (27d) has a bypass intermediate chamber (27e), via which the first control chamber (14a) is connectable to the second control chamber (14b), wherein, in a first switching position (B1) of the bypass valve (27), the bypass intermediate chamber (27e) is open and connects the first control chamber (14a) to the third control chamber (14c) and, in a second switching position (B2) of the bypass valve (27), the bypass intermediate chamber (27e) is closed by a closure piston (27g) separating the first control chamber (14a) from the third control chamber (14c).

9. The control valve (12) as claimed in claim 8, wherein, in the first switching position (B1) of the bypass valve (27), the closure piston (27g) closes a bypass inlet (27f), wherein the bypass inlet (27f) is connected to the atmosphere (A), and, in the second switching position (B2) of the bypass valve (27), the bypass inlet (27f) moves off from the closure piston (27g) and is thereby connected to the third control chamber (14c) to vent the third control chamber (14c).

10. The control valve (12) as claimed in claim 1, comprising a first wall, a second wall, and a third wall, wherein the control arrangement comprises an adjustable second control chamber (14b) and an adjustable second control piston (15b), wherein the parking-brake control pressure (p5) is configured to be admitted into the second control chamber (14b) via the second control input (12b) and the second control piston (15b) is adjustable in the first direction (R1) and the second direction (R2) by action of the parking-brake control pressure (p5) on the second control piston (15b), wherein the second control chamber (14b) is bounded by the third wall (17c), which is arranged on the adjustable second control piston (15b), wherein the third wall (17c) is movable relative to the valve housing (12f) in such a manner that the second control piston (15b) is adapted to be adjusted by the parking-brake control pressure (p5) on the third wall (17c).

11. The control valve (12) as claimed in claim 10, wherein the first control piston (15a) is operatively connected to the second control piston (15b) in such a manner that the second control piston (15b) is carried along at least in regions by an adjustment of the first control piston (15a).

12. The control valve (12) as claimed in claim 11, wherein the first control chamber (14a) is bounded by the first wall (17a) which is movable in relation to a valve housing (12f) and by the second wall (17b) which is fixedly connected to the valve housing (12f), wherein the first control piston (15a) is connected to the first wall (17a) in such a manner that the first control piston (15a) and the second control piston (15b) which is operatively connected thereto are forced by an increase in pressure in the first control chamber (14a) in a first direction (R1), in particular wherein the second control chamber (14b) is arranged relative to the first control chamber (14a) in such a manner that the second control piston (15b) and the first control piston (15a) which is operatively connected thereto are forced, when there is an increase in pressure in the second control chamber (14b), in the second direction (R2) when the first control chamber (14a) and/or the third control chamber (14c) are connected to the atmosphere (A).

13. The control valve (12) as claimed in claim 12, wherein the second control chamber (14b) is likewise bounded by the second wall (17b) which is fixedly connected to the valve housing (12f), wherein, when there is an increase in pressure in the second control chamber (14b), the second control piston (15*b*) is pushed away from the second wall (17*b*) in the second direction (R2), and, when there is an increase in pressure in the first control chamber (14*a*), the first control piston (15*a*) is pushed away from the second wall (17*b*) in the first direction (R1).

14. The control valve (12) as claimed in claim 10, wherein the first control chamber (14*a*) and the second control chamber (14*b*) interact with each other via the first and second control pistons (15*a*, 15*b*) in such a manner that a spring-loaded brake pressure (p3*b*) arises at the working output (12*c*), the spring-loaded brake pressure being dependent on the parking-brake control pressure (p5) prevailing in the second control chamber (14*b*) and on the service-brake control pressure (pV; pR) prevailing in the first control chamber (14*a*).

15. The control valve (12) as claimed in claim 10, wherein the control arrangement further comprises an axially movable valve body (22) pretensioned by a compression spring (23), wherein, depending on an axial adjustment of the valve body (22), the working output (12*c*) is connectable either via a pressure chamber (16) to a venting connection (12*e*) for reducing the spring-loaded brake pressure (p3*b*), or to a supply connection (12*d*) for increasing the spring-loaded brake pressure (p3*b*), wherein the second control piston (15*b*) is adapted to adjust the valve body (22) axially as a function of the parking-brake control pressure (p5) and the service-brake control pressure (pV; pR).

16. The control valve (12) as claimed in claim 1, wherein the control valve (12) interacts with a switchable switch-over valve (26) in such a manner that the first control chamber (14*a*) is configured to be connected to a service-brake valve (4) for predetermining a service-brake control pressure (pV; pR) in the first control chamber (14*a*), or is configured to be connected to an atmosphere (A) for venting the first control chamber (14*a*), wherein the switch-over valve (26) is integrated in the control valve (12) or is connected upstream of the first control input (12*a*) of the control valve (12).

17. An electronically controllable brake system (1) comprising a control valve according to claim 1, front-axle wheel brakes (2), rear-axle wheel brakes (3) with a spring-loaded part (3*b*) and a membrane part (3*c*), an electro-pneumatically controllable front-axle pressure modulator (6) for outputting a front-axle brake pressure (p2) to the front-axle wheel brakes (2), an electronically controllable rear-axle pressure-modulator (11) for outputting a membrane-brake pressure (p3*c*) to the membrane parts (3*c*) of the rear-axle wheel brakes (3), a central module (7), an electro-pneumatic service-brake valve (4), wherein the service-brake valve (4) is configured to output an electric service-brake actuating signal (S4) to the central module (7) as a function of a service-brake braking demand (VB), wherein the central module (7) is connected in a signal-conducting manner to the front-axle pressure modulator (6) and to the rear-axle pressure modulator (11) for transmitting control signals (S2, S3), which are dependent on the service-brake actuating signal (S4), to the pressure modulators (6, 11), wherein the service-brake valve (4) is furthermore configured to output a pneumatic service-brake control pressure (pV; pR) as a function of the service-brake braking demand (VB), wherein, in the event of redundancy, the front-axle pressure modulator (6) is activatable via a redundancy connection (6*a*) with a front-axle service-brake control pressure (pV), wherein the service-brake valve (4) is connectable pneumatically to the first control input (12*a*) of the control valve (12) for transmitting the service-brake control pressure (pV; pR) to the control valve (12) and for setting the spring-loaded brake pressure (p3*b*) at the spring-loaded parts (3*b*) of the rear-axle wheel brakes (3) as a function of the parking-brake control pressure (p5) and/or of the service-brake control pressure (pV; pR)

wherein the brake system (1) further comprises a parking-brake valve (5) outputting a parking-brake control pressure (p5) to the second control input (12*b*) of the control valve (12) as a function of a parking-brake braking demand (VP), wherein the control valve (12) is configured to set a spring-loaded brake pressure (p3*b*) at the working output (12*c*) of the control valve (12) as a function of the parking-brake control pressure (p5) and the working output (12*c*) of the control valve (12) is connected to spring-loaded parts (3*b*) of the rear-axle wheel brakes (3) for also setting the spring-loaded brake pressure (p3*b*) at the spring-loaded parts (3*b*) of the rear-axle wheel brakes (3).

18. The electronically controllable brake system (1) as claimed in claim 17, wherein the central module (7) is connected in a signal-conducting manner to a switch-over valve (26), which is integrated in the control valve (12) or is connected upstream of the first control input (12*a*), for selectively connecting the service-brake valve (4) to the first control chamber (14*a*) of the control valve (12) or the atmosphere (A) to the first control chamber (14*a*) of the control valve (12), wherein, during normal operation without there being a defect or a failure in the electric activation of the rear-axle pressure modulator (11), it can be predetermined via a switching-over signal (S1) transmitted to the switching-over valve (26) that the atmosphere (A) is connected to the first control chamber (14*a*) and otherwise the service-brake valve (4) is connected to the first control chamber (14*a*).

19. The electronically controllable brake system (1) as claimed in claim 17, wherein the service-brake valve (4) is formed with a single channel, and the front-axle control pressure (pV) which is supplied to the front-axle pressure modulator (6) by the service-brake valve (4) is also configured to be supplied via a branch line (13) to the first control input (12*a*) of the control valve (12), or the service-brake valve (4) is formed with two channels, wherein a first channel (K1) is connected to the redundancy connection (6*a*) of the front-axle pressure modulator (6) for pneumatically activating the front-axle pressure module (6) with the front-axle service-brake control pressure (pV) and a second channel (K2) is connected to the first control input (12*a*) of the control valve (12) for transmitting a redundancy control pressure (pR) produced in the service-brake valve (4) to the control valve (12).

20. A method for controlling an electrically controllable brake system (1) as claimed in claim 17, wherein, when an electric defect or a failure in the electric activation of the rear-axle wheel brakes (3) is detected, the service-brake valve (4) is connected to the first control chamber (14*a*) by the membrane part (3*c*) (St0), and therefore a spring-loaded brake pressure (p3*b*) which is dependent on the service-brake control pressure (pV; pR) is configured to be set (St1*a*) at the spring-loaded parts (3*b*) of the rear-axle wheel brakes (3), wherein the spring-loaded brake pressure (p3*b*) is predetermined in the control valve (12) as a function of a switching position (B1, B2) of a bypass valve (27), wherein different compressive forces (X1, X2) act on the first control piston (15a) depending on the switching position (B1, B2) of the bypass valve (27).

21. The method as claimed in claim 20, wherein the bypass valve (27) is switched over in the control valve (12) as a function of a defined pressure limit (pG) in the first control chamber (14a), wherein the first control chamber (14a) is connected to the third control chamber (14c) via the bypass valve (27) when, during pressurization of the first control chamber (14a) with the service-brake control pressure (pV; pR), the service-brake control pressure (pV; pR) exceeds the defined pressure limit (pG), and the first control chamber (14a) is disconnected from the third control chamber (14c) via the bypass valve (27) when the service-brake control pressure (pV; pR) falls below the defined pressure limit (pG).

22. The method as claimed in claim 20, wherein the central module (7) directs the switch-over valve (26) during normal operation via the switching-over signal (S1) to connect the first control chamber (14a) to the atmosphere (A), absent a detection of an electric defect or a failure in the electric activation of the rear-axle wheel brakes (3) by the membrane part (3c) (St0).

\* \* \* \* \*